Patented Apr. 6, 1954

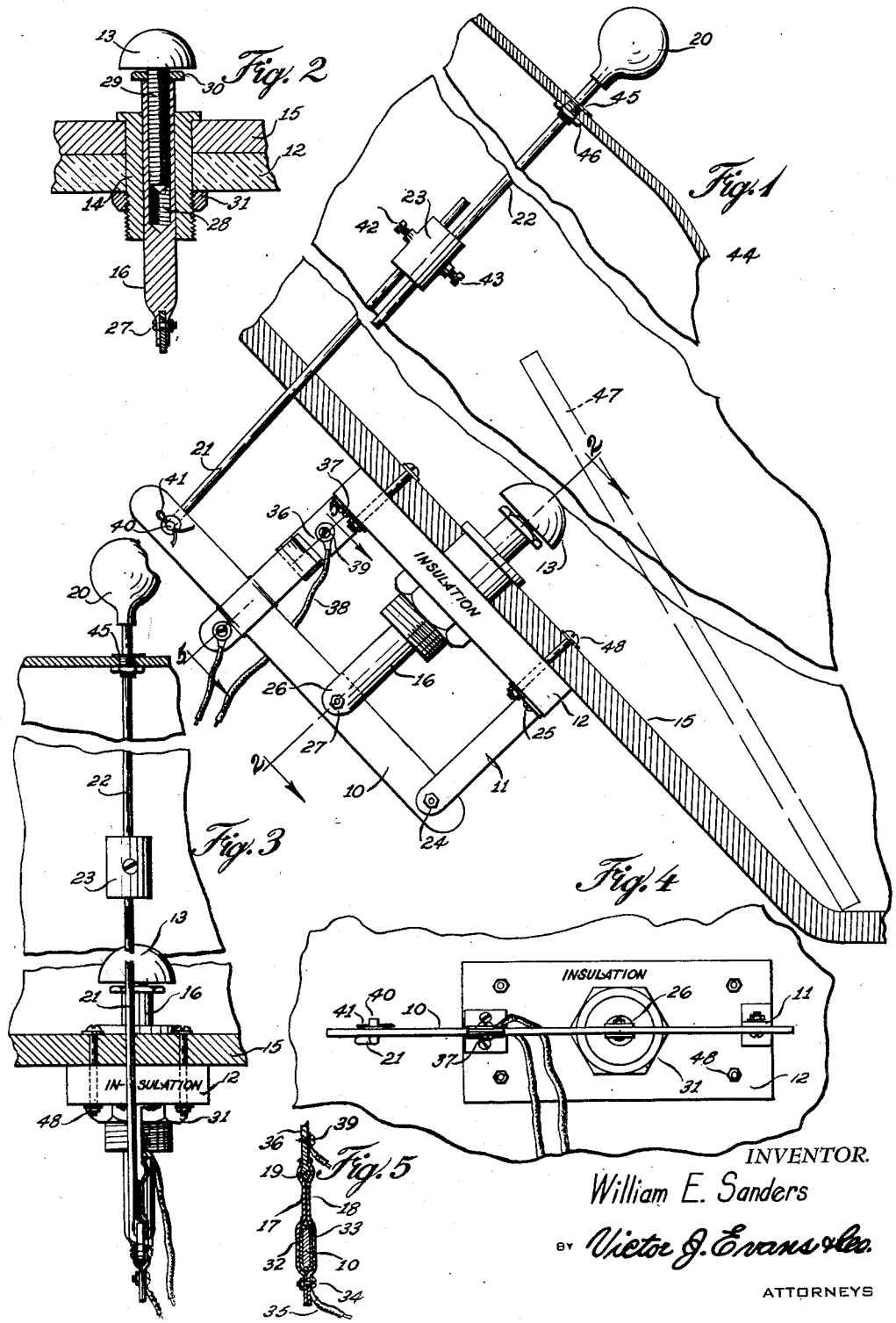

2,674,668

UNITED STATES PATENT OFFICE 2,674,668

MOTOR VEHICLE EMERGENCY SWITCH

William E. Sanders, Watertown, N. Y.

Application August 13, 1952, Serial No. 304,131

3 Claims. (Cl. 200—61.89)

This invention relates to safety devices for protecting operators of motor vehicles, in an emergency, and particularly where an operator loses his head and forces the accelerator pedal of the vehicle as far as it will go, and in particular a foot actuated switch in which a button positioned below the accelerator pedal of the vehicle actuates the switch to break the ignition circuit of a motor when the accelerator pedal is forced against the floor.

The purpose of this invention is to provide means for automatically breaking the ignition circuit of a motor of a motor vehicle when an operator of the vehicle accidently presses the accelerator pedal as far as it will go.

In an emergency, when an operator of a motor vehicle realizes that it is necessary to stop the vehicle instantly he sometimes presses his foot upon the accelerator pedal instead of the brake pedal and with the throttle wide open the motor runs wild. With this thought in mind this invention contemplates a button positioned on the floor of a vehicle below the accelerator pedal whereby upon pressing the accelerator pedal all the way to the floor a switch is actuated to break the ignition circuit of the motor.

The object of this invention is, therefore, to provide means for incorporating a safety switch in a motor vehicle whereby with the switch connected in the ignition circuit of the vehicle the circuit is broken when the accelerator pedal of the vehicle is pressed beyond a predetermined position.

Another object of the invention is to provide a safety switch for motor vehicles in which the switch may be incorporated in vehicles now in use without changing the design or arrangement of the parts of the vehicle.

A further object of the invention is to provide a safety switch for breaking a circuit to a motor of a motor vehicle when the accelerator pedal is accidently pressed beyond a predetermined position, in which the device is of a simple and economical construction.

With these and other objects and advantages in view the invention embodies a knife switch or bar pivotally mounted on the under side of a floor board of a motor vehicle and positioned to correspond with an accelerator pedal of the vehicle, a button slidably mounted in the floor of the vehicle and positioned to be engaged by the accelerator pedal, contact arms connected in the ignition circuit of the motor of the vehicle and positioned to be opened and closed by the bar, and a knob adjustably connected to the bar for returning the switch to an operative position after use thereof.

Other features and advantages of the invention will appear from the following description taken in connection with the drawing, wherein:

Figure 1 is a view showing a section through the floor board of a motor vehicle with the switch structure shown in elevation on the under surface thereof.

Figure 2 is a cross section through the button mounting of the emergency switch, being taken on line 2—2 of Fig. 1.

Figure 3 is an end elevational view of the switch and mounting looking toward the end of the switch on which the pull knob is positioned.

Figure 4 is a view looking upwardly toward the under side of the switch.

Figure 5 is a cross section taken on line 5—5 of Fig. 1 showing the spring contact of the switch.

Referring now to the drawing wherein like reference characters denote corresponding parts the improved emergency switch of this invention includes a knife bar 10 pivotally mounted by arms 11 on a base 12 of insulating material, a button 13 slidably mounted in a sleeve 14 in a floor as indicated by the numeral 15 and connected to the knife bar 10 with a stem 16, spring contact arms 17 and 18 positioned to snap over a bead 19 carried by the base 12 and a knob 20 connected to the bar 10 with rods 21 and 22, the rods being adjustably connected with a collar 23.

The knife bar 10, which is similar to the knife, of a knife switch, is pivotally mounted with a pin 24 in the outer end of the member 11 and the members or arms are secured to the base 12 with screws 25.

The stem 16 is provided with a bifurcated end 26 through which the bar 10 passes and the stem is pivotally connected to the bar with a pin 27. The stem 16 is provided with a threaded bore 28 into which a shank 29 of the button 13 is threaded, and as illustrated in Fig. 2 the threaded shank 29 is provided with a lock nut 30 by which the button 13 is secured in adjusted positions. The bushing 14 is also provided with a lock nut 31 by which it is secured in the base 12 and floor 15.

The spring fingers or arms 17 and 18 are mounted on the bar 10, as illustrated in Fig. 5 with strips of insulation 32 and 33 and with the ends of the arms held together with a screw 34. The screw 34 also provides means for connecting a contact wire 35 to the arms 17 and 18 and the arcuate sections at the opposite ends of the arms are positioned to snap over the bead 19 on a plate 36 extended from the base 12 and which is mounted on the base with screws 37. A contact wire 38 is secured to the plate 36 with a screw 39 and with the wires 35 and 38 connected in the ignition system of a motor of the vehicle the circuit of the ignition system is broken when the fingers 17 and 18 are forced away from the bead 19 on the plate 36.

The rod 21 is formed with an end 40 that extends at a right angle to the rod and the end 40 is secured in an opening in the end of the bar 10 with a cotter pin or other fastener, as indicated by the numeral 41.

The rods 21 and 22 are secured in the collar 23 with set screws 42 and 43, respectively and the rod 22 is slidably mounted in the instrument board, as indicated by the numeral 44 of the vehicle, with a bushing 45 having a lock nut 46 on the inner end.

The safety switch of this invention is mounted on the under surface of the inclined floor board, as indicated by the numeral 15, at the forward end of a vehicle whereby the button 13 is positioned below the accelerator pedal, which is indicated by the numeral 47. The base 12, which is formed of insulating material is secured to the floor 15 with bolts 48 or by other suitable fastening means.

With the parts arranged in this manner the switch is mounted on the under surface of the inclined floor board with the button 13 positioned below the accelerator pedal and as the pedal 47 is pressed downwardly the stem of the button 13 moves the bar 10 away from the base of the switch whereby the spring fingers 17 and 18 pass from the bead 19 of the plate 36, thereby breaking the circuit to the motor.

When it is desired to return the device the knob 20 is drawn upwardly whereby the bar 10 is returned to the position shown in Fig. 1 with the contact fingers 17 and 18 positioned over the bead 19 of the plate 36.

It will be understood that modifications, within the scope of the appended claims may be made in the design and arrangement of the parts without departing from the spirit of the invention.

What is claimed is:

1. In an emergency switch for motor vehicles, the combination which comprises a base of insulating material adapted to be mounted against the under surface of the inclined section of a floor at the forward end of a vehicle, arms extended from one end of the base, a bar pivotally mounted in the extended ends of the arms and positioned to extend longitudinally of the base, a bushing extended through the base, a stem slidably mounted in the bushing, pivotally connected at one end, to the bar and having a button on the opposite end which with the base positioned against the under surface of a floor board of the motor vehicle is positioned to be engaged by the accelerator pedal of the vehicle, switch elements adapted to be closed by the bar, and a rod extended from the bar through the instrument panel of the vehicle and having a knob on the end extended through the instrument panel whereby upward movement of the knob draws the bar upwardly to bring said contact elements into engagement.

2. In an emergency switch for motor vehicles, the combination which comprises a base of insulating material adapted to be mounted against the under surface of the inclined section of a floor at the forward end of a vehicle, arms extended from one end of the base, a bar pivotally mounted in the extended ends of the arms and positioned to extend longitudinally of the base, a bushing extended through the base, a stem slidably mounted in the bushing, pivotally connected at one end, to the bar and having a button on the opposite end which with the base positioned against the under surface of a floor board of the motor vehicle is positioned to be engaged by the accelerator pedal of the vehicle, switch elements adapted to be closed by the bar, and a rod extended from the bar through the instrument panel of the vehicle and having a knob on the end extended through the instrument panel whereby upward movement of the knob draws the bar upwardly to bring said contact elements into engagement, said contact elements being connected in the ignition circuit of the engine of the vehicle.

3. In an emergency switch for motor vehicles, the combination which comprises a base of insulating material adapted to be installed on the under surface of a floor of a vehicle, a knife bar substantially parallel to the base, arms extended from one end of the base and pivotally connected to the knife bar, a bushing extended through the base and adapted to extend through a floor against which the base may be positioned, a stem pivotally connected to the bar and extended through the bushing, a button on the end of the stem extended through the bushing, a contact mounted on the end of the base opposite to that from which the arms extend, a contact carried by the bar and positioned to engage the contact mounted on the base, and a rod having a knob on the extended end pivotally connected to the end of the knife bar opposite to the end pivotally mounted by the arms on the block of insulating material and having a knob on the end extended through the floor and instrument board of the vehicle.

References Cited in the file of this patent

UNITED STATES PATENTS

| Number | Name | Date |
|---|---|---|
| 1,002,996 | Jordan | Sept. 12, 1911 |
| 1,191,924 | Burn | July 18, 1916 |
| 2,301,584 | Rodrick | Nov. 10, 1942 |
| 2,519,815 | Beane | Aug. 22, 1950 |